Patented Dec. 19, 1939

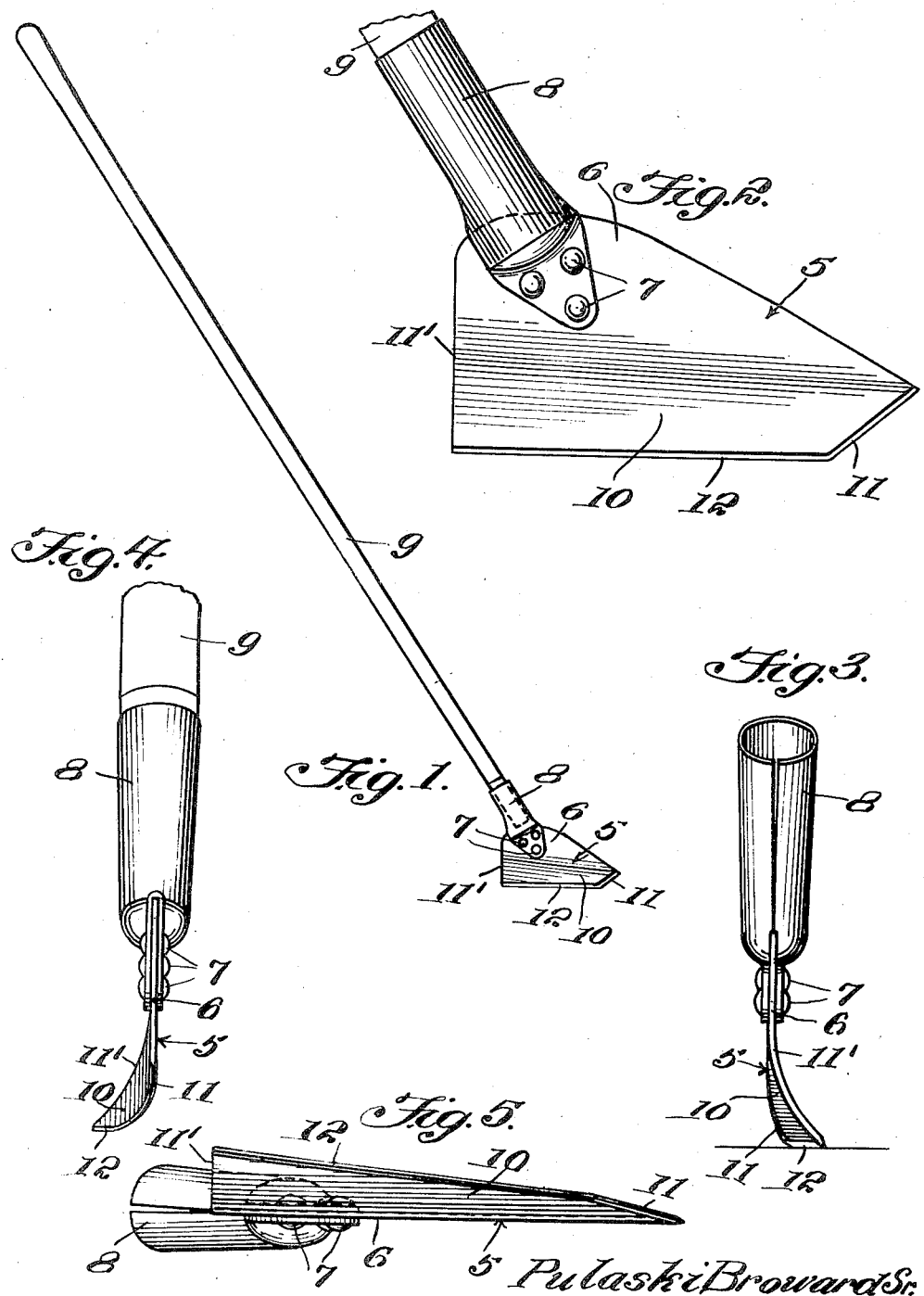

2,184,034

UNITED STATES PATENT OFFICE 2,184,034

LAWN TRIMMING TOOL

Pulaski Broward, Sr., South Jacksonville, Fla.

Application August 30, 1938, Serial No. 227,587

1 Claim. (Cl. 97—227)

My invention relates to lawn trimming tools and has as one of the principal objects thereof the provision of a lawn trimming tool so constructed and arranged whereby the edges of a lawn adjacent sidewalks, flower beds and the like may be conveniently and neatly trimmed.

Another object of my invention is to provide a device of the above described character which is simple in construction, durable in use, efficient in operation and economical in manufacture.

Other objects and advantages will be apparent from the following description, appended claim and annexed drawing.

Referring to the drawing wherein like reference characters designate like parts throughout the several views:

Figure 1 is a side elevation of my invention.

Figure 2 is an enlarged side elevation of the trimming blade having a handle socket attached thereto.

Figure 3 is a rear elevation of Figure 2.

Figure 4 is a front elevation of Figure 2.

Figure 5 is a bottom plan view of the blade.

In practicing my invention I provide a trimming blade 5 fashioned with an upper section 6 to which is secured, by means of rivets 7, an upwardly and rearwardly extending handle socket 8 in which is secured the lower end of a handle 9 whereby said blade may be conveniently operated as hereinafter set forth.

The blade is fashioned with a lower elongated outwardly curved section 10, the front end of which is formed with an upwardly and forwardly extending cutting edge 11. The lower end of said edge 11 effects jointure with a lower longitudinally extending cutting edge 12 of the lower section 10. The rear end of the blade is formed with a vertically extending edge 11' which coacts with said section 10 to form a heel. The lower section, being bent outwardly relative to the upper section, serves to dispose the handle 9 in an upwardly and outwardly inclined position when the faces of the lower section are disposed in a vertical position.

In use, the lower section 10 is disposed in a substantially vertical plane adjacent the side wall of a sidewalk, coping or flower bed and the heel of the blade is then drawn over the surface of the lawn or the like adjacent said side wall to effect trimming of said lawn. The inclined cutting edge 11 coacts with the edge 12 to effect trimming of rounded corners of the lawn or by being brought into active engagement with the lawn upon inclining of the edge 12. The edge 11 is also useful to remove grass, weeds or the like from cracks within the surface of a roadway or the like.

From the foregoing it will be apparent that I have provided a simple and efficient tool whereby lawns and the like may be neatly and conveniently trimmed adjacent sidewalks, flower beds, copings and other similar places.

What I claim is:

A device of the character described, comprising, a blade having upper and lower sections, an upwardly and rearwardly extending handle secured to said upper section, said lower section fashioned with a cutting edge and curved longitudinally relative to said upper section whereby to dispose the axis of said handle at an angle relative to said lower section when said lower section is operated in a vertical plane, said lower section having an inclined cutting edge at the front thereof coacting with said first mentioned cutting edge to effect trimming of arcuate shaped edges of a lawn and the like upon upward movement of said handle.

PULASKI BROWARD, Sr.